(12) United States Patent
Ford et al.

(10) Patent No.: US 8,762,744 B2
(45) Date of Patent: Jun. 24, 2014

(54) ENERGY MANAGEMENT SYSTEM CONFIGURED TO GENERATE ENERGY MANAGEMENT INFORMATION INDICATIVE OF AN ENERGY STATE OF PROCESSING ELEMENTS

(75) Inventors: Simon Andrew Ford, Cambridge (GB); Daryl Wayne Bradley, Cambridgeshire, MI (US); George James Milne, Cambridge (GB); John Michael Horley, Cambridgeshire, MI (US)

(73) Assignee: ARM Limited, Cambridge (GB)

( * ) Notice: Subject to any disclaimer, the term of this patent is extended or adjusted under 35 U.S.C. 154(b) by 1290 days.

(21) Appl. No.: 12/085,962

(22) PCT Filed: Dec. 6, 2005

(86) PCT No.: PCT/GB2005/004696
§ 371 (c)(1),
(2), (4) Date: Jun. 3, 2008

(87) PCT Pub. No.: WO2007/066058
PCT Pub. Date: Jun. 14, 2007

(65) Prior Publication Data
US 2009/0254767 A1    Oct. 8, 2009

(51) Int. Cl.
*G06F 1/00* (2006.01)
*G06F 1/26* (2006.01)

(52) U.S. Cl.
USPC ............... 713/300; 703/18; 702/60; 713/320

(58) Field of Classification Search
USPC ............. 702/60; 710/1, 15; 713/3, 300, 320; 714/33; 365/230.03; 712/214; 717/131; 375/372; 718/100; 703/16, 18
See application file for complete search history.

(56) References Cited

U.S. PATENT DOCUMENTS 5,940,779 A * 8/1999 Gaitonde et al. ................ 702/60
6,055,640 A * 4/2000 Kageshima et al. ........... 713/320

(Continued)

FOREIGN PATENT DOCUMENTS

| EP | 1 182 552 | 2/2002 |
| EP | 1 351 148 | 10/2003 |
| EP | 1 494 110 | 1/2005 |

OTHER PUBLICATIONS

International Search Report for PCT/GB2005/004696, mailed Apr. 6, 2006.

(Continued)

*Primary Examiner* — Thomas Lee
*Assistant Examiner* — Aurel Prifti
(74) *Attorney, Agent, or Firm* — Nixon & Vanderhye P.C.

(57) ABSTRACT

A data processing apparatus and methods are disclosed. The data processing apparatus comprises: data processing elements operable to process data; an energy management unit operable to generate energy management information indicative of an energy state of at least one of the data processing elements when processing said data; and logic operable to receive said energy management information and to generate energy management information items associating said energy state with the processing of said data. The information items can provide visibility of how the Energy State of the data processing elements vary in response to the processing of data. Providing this visibility of the Energy State can advantageously enable more detailed the energy management to be performed and the Energy State of the data processing elements to be optimized.

30 Claims, 5 Drawing Sheets

(56) References Cited

U.S. PATENT DOCUMENTS

| | | | |
|---|---|---|---|
| 6,096,089 A * | 8/2000 | Kageshima | 703/18 |
| 6,205,555 B1 * | 3/2001 | Kageshima et al. | 713/300 |
| 6,289,488 B1 * | 9/2001 | Dave et al. | 716/105 |
| 6,704,876 B1 | 3/2004 | Iacobovici et al. | |
| 6,820,222 B2 * | 11/2004 | Swoboda | 714/33 |
| 6,834,353 B2 * | 12/2004 | Smith et al. | 713/320 |
| 6,865,526 B1 * | 3/2005 | Henkel et al. | 703/18 |
| 6,912,664 B2 * | 6/2005 | Ranganathan et al. | 713/320 |
| 7,174,468 B2 * | 2/2007 | Gary et al. | 713/300 |
| 7,194,647 B2 | 3/2007 | Flynn | |
| 7,200,763 B2 * | 4/2007 | Williams | 713/320 |
| 7,234,068 B2 * | 6/2007 | Nonogaki et al. | 713/340 |
| 7,321,942 B2 * | 1/2008 | Flautner et al. | 710/15 |
| 2002/0099964 A1 | 7/2002 | Zdravkovic | |
| 2002/0194511 A1 | 12/2002 | Swoboda | |
| 2003/0023885 A1 * | 1/2003 | Potter et al. | 713/300 |
| 2004/0268159 A1 * | 12/2004 | Aasheim et al. | 713/300 |
| 2005/0044438 A1 | 2/2005 | Nonogaki et al. | |
| 2005/0097228 A1 * | 5/2005 | Flautner et al. | 710/1 |
| 2005/0177327 A1 * | 8/2005 | Banginwar et al. | 702/60 |
| 2005/0220239 A1 * | 10/2005 | Sigurdsson et al. | 375/372 |
| 2006/0036834 A1 * | 2/2006 | Maiyuran et al. | 712/214 |
| 2006/0107262 A1 * | 5/2006 | Bodas et al. | 718/100 |
| 2006/0179334 A1 * | 8/2006 | Brittain et al. | 713/320 |
| 2006/0181949 A1 * | 8/2006 | Kini | 365/230.03 |
| 2007/0006174 A1 * | 1/2007 | Sohm et al. | 717/131 |
| 2009/0171646 A1 * | 7/2009 | Silbermintz et al. | 703/16 |

OTHER PUBLICATIONS

International Preliminary Report on Patentability for PCT/GB2005/004696, mailed Apr. 16, 2008.

* cited by examiner

ENERGY MANAGEMENT SYSTEM CONFIGURED TO GENERATE ENERGY MANAGEMENT INFORMATION INDICATIVE OF AN ENERGY STATE OF PROCESSING ELEMENTS

This application is the U.S. national phase of International Application No. PCT/GB2005/004696, filed 6 Dec. 2005, the entire contents of each of which are hereby incorporated by reference.

TECHNICAL FIELD

The technical field relates to energy management. Embodiments below relate to techniques for energy management in a data processing apparatus.

BACKGROUND

Techniques for energy management in data processing apparatus are known. Energy management is particularly important in low power or mobile data processing apparatus applications. This is because in these applications there is generally provided a finite energy source, such as a battery. By managing the energy consumed it is possible to prolong the operation of the data processing apparatus. Equally, for conventionally powered data processing apparatus, managing the energy used by the data processing apparatus can reduce heat generation and provide for lower running costs.

In order to vary the energy consumed it is known to vary the performance of the data processing apparatus. Increasing the performance of the data processing apparatus increases the energy consumed, whilst reducing performance of data processing apparatus can reduce the energy consumed. The performance of a data processing apparatus is generally varied by altering the operating voltage and operating frequency of that data processing apparatus.

Accordingly, the energy consumed by the data processing apparatus can be varied in dependence on the particular operating state of the data processing apparatus. For example, when the data processing apparatus is in a dormant state it is known to reduce its performance, thereby minimising energy consumption and helping to maximise battery life. Equally, when the data processing apparatus is performing intensive operations it is known to maximise its performance, which increases the energy consumed by the data processing apparatus and decreases battery life.

Whilst these techniques enable energy to be actively managed, there remains further scope for improvement.

Accordingly, it is desired to provide an improved technique for energy management.

SUMMARY OF THE INVENTION

According to a first aspect, there is provided a data processing apparatus comprising: data processing elements operable to process data; an energy management unit operable to generate energy management information indicative of an energy state of at least one of said processing elements when processing said data; and logic operable to receive the energy management information and to generate energy management information items associating said energy state with the processing of the data;

wherein said logic comprises trace logic operable to generate said energy management information items as trace data for transmission to trace analysing logic.

The inventors recognized that it is difficult to optimise the energy management of the data processing apparatus because there is limited visibility of how the data being processed by the data processing apparatus affects the energy state of the data processing apparatus. Hence, it is generally only possible to perform very coarse energy management using very simplistic algorithms because it is difficult to determine how the energy state of the data processing apparatus will vary in response to particular data processing activities.

Accordingly, an energy management unit is provided which can generate energy management information regarding the energy state of data processing elements when processing data. The data processing elements may comprise any unit of the data processing apparatus such as, for example, a processor core, a bus, memory device, or other processing component or unit. The energy management information can then be used to generate information items which provide a correlation between the energy state and data being processed. Hence, the information items can provide visibility of how the energy state of the data processing apparatus varies in response to the processing of that data. It will be appreciated that providing this visibility of the energy state can advantageously enable more detailed energy management to be performed and the energy state of the data processing apparatus to be optimised.

Providing visibility of the relationship between energy state and data processing can be beneficial for a variety of purposes. For example, such an approach can assist an application developer where energy control software is under operating system control and the application developer has no direct control of the energy control software or hardware. The visibility of the relationship between energy state and processing activities provides the application developer with information which was not previously available. Also, such an approach can assist a software developer when debugging software where he needs to understand and optimise for particular system events, such as testing and validating that a fast response occurs for interrupts which requires a high energy state. The visibility of the relationship between energy state and instructions provides the application developer with information on the energy state of the system during an interrupt request in a non-invasive manner. Furthermore, such an approach can be used when optimising data transfers on busses since the energy state information can provide visibility of the bus utilisation and the burstiness of data transfer over the bus. This information may then be used to reduce the burstiness and provide a more consistent flow of data over the bus to improve energy usage.

In embodiments, said logic is operable to generate said energy management information items associating said energy state when processing said data with time.

Accordingly, information can be provided which shows how the energy state of the processing elements varies over time. It will be appreciated that time may be represented in a variety of ways such as, for example, clock cycles, periodic signals, real-time clock signals, etc.

In embodiments, said logic is operable to generate said energy management information items associating said energy state when processing said data with events.

Accordingly, information can be provided which shows how the energy state of the processing elements varies in response to particular events. It will be appreciated that time may be represented in a variety of ways such as, for example, on the occurrence of a bulk transfer to a particular device, on the occurrence of accesses to a bus or memory, on the occurrence of an interrupt or change of mode, on the occurrence of an external event such as a signal change on an external pin or an internally generic trigger such as an embedded cross triggering mechanism for event transfers across a chip.

In embodiments, said data comprises a sequence of instructions and said logic is operable to generate said energy management information items associating said sequence of instructions with said energy state.

Accordingly, the information item may provide a direct association between the energy state of the data processing elements and the instructions being executed. It will be appreciated that this approach provides very detailed information on the energy state of the data processing elements.

In embodiments, the logic is operable to generate an energy management information item associating an instruction with the energy state of the at least one of the data processing elements when processing that instruction.

Accordingly, the information item may provide a direct association between the energy state of the data processing elements and the particular instruction being executed. It will be appreciated that this approach provides very detailed information on the energy state of the data processing elements. It will be appreciated that the information items may be provided on a cycle-by-cycle or instruction-by-instruction basis.

In one embodiment, the logic is operable to generate an energy management information item associating a group of instructions with the energy state of the at least one of the data processing elements when processing that group of instructions.

Accordingly, instead of providing energy state information for each individual instruction, it is also possible to provide energy state information for a plurality of instructions. In this way, it will be appreciated that the amount of energy state information generated may be reduced. It will be appreciated that the group of instructions may comprise an application, a task, a process or a particular sub-routine which includes more than one instruction.

In one embodiment, the energy state of the at least one of the data processing elements comprises an energy consumption of the at least one of the data processing elements when processing the data.

Accordingly, the energy management information items may relate to the energy consumed or used by the data processing elements when processing the data. Hence, it is possible to readily determine from the information items how much energy is used by systems where that data is being processed. It will be appreciated that such information is extremely useful for energy management.

In one embodiment, the energy consumption is a function of an operating voltage of the at least one of the data processing elements and an amount of time taken by the at least one of the data processing elements when processing the data.

In one embodiment, the at least one of the data processing elements is operable to process an algorithm which determines for the data an estimated energy consumption of the at least one of the data processing elements when processing the data and the energy state of the at least one of the data processing elements comprises the estimated energy consumption.

Accordingly, an algorithm may be provided which enables an estimate to be made of the likely energy consumption of the data processing elements when processing the data. The energy management information items may be arranged to include an indication of that estimate. Accordingly, in those embodiments which use some form of energy management system which utilises predicted energy usage information, it is possible to provide an indication of the predicted energy usage information in order to verify that those predictions were correct and validate the algorithm used to generate those estimates.

In one embodiment, the algorithm receives an indication of performance criteria associated with the data and is operable to determine a minimum estimated energy consumption of the at least one of the data processing elements which is estimated to enable the performance criteria to be achieved.

Accordingly, the algorithm used to generate the estimated energy usage may utilise a performance criteria associated with the data in order to estimate a minimum energy consumption of the data processing elements which would still enable those performance criteria to be met.

In one embodiment, the minimum estimated energy consumption is function of a minimum operating voltage and operating frequency of the at least one of the data processing elements which is estimated to enable the performance criteria to be achieved.

Accordingly, the algorithm may determine the minimum voltage and frequency at which the data processing elements may operate and still achieve the required performance criteria; from this the estimated minimum energy consumption can be generated.

In one embodiment, the energy management unit is responsive to the minimum estimated energy consumption to select one of a number of predetermined energy settings that the at least one of the data processing elements should be operated at and the energy state of the at least one of the data processing elements comprises an indication of the selected one of the number of predetermined energy settings.

Accordingly, the energy management unit functions to drive the data processing elements at one of a number of predetermined energy levels. Generally, the predetermined energy level will be the minimum predetermined setting which encompasses the minimum estimated energy consumption. In this way, it will be appreciated that the data processing elements will be operated at an energy level which is sufficient to satisfy the minimum energy consumption but without driving the data processing elements at any higher than the minimum energy setting required. The energy information item may also include an indication of the setting selected by the energy management unit which further enables the operation of the energy management unit to be verified.

In one embodiment, each of the predetermined energy settings has a predetermined voltage and predetermined frequency at which the at least one of the data processing elements should be operated.

Accordingly, the energy settings may relate to particular pre-set combinations of voltage levels and frequencies at which the data processing elements will be driven.

In one embodiment, the energy management unit is operable to determine an amount of additional energy available for use by the at least one of the data processing elements when processing the data and the energy state comprises the amount of additional energy available.

Accordingly, the energy management information items may provide an indication of the amount of additional, available or unutilised energy which is available for use by the data processing elements. It will be appreciated that providing this information is useful since it enables a measure to be provided of the amount of excess energy available to the data processing elements and may be used to determine whether the energy setting of the data processing elements could be further reduced.

In one embodiment, the energy management unit is operable to determine the amount of additional energy available using an energy consumption of the at least one of the data processing elements when processing the data and a selected one of a number of predetermined energy settings that the at least one of the data processing elements should be operated.

Accordingly, the amount of additional energy available can readily be determined by comparing the currently selected energy level with the amount of energy being used by the data processing elements.

In one embodiment, the energy management unit is operable to determine the amount of additional energy available using an estimated energy consumption of the at least one of the data processing elements when processing the data and a selected one of a number of predetermined energy settings that the at least one of the data processing elements should be operated.

Hence, the amount of available energy may also be determined by simply comparing the current energy setting with the estimated energy consumption of the data processing elements when processing that data.

In one embodiment, the logic comprises trace logic operable to generate the energy management information items as trace data for transmission to trace analysing logic.

Hence, the energy management information items may be provided in a similar manner to conventional trace data, as is well known in the art. Using trace infrastructure to provide the energy state enables the information to be provided in a convenient and non-intrusive manner. Also, it will be appreciated that existing techniques for compressing or reducing the amount of trace data which needs to be generated can also readily be applied to the energy state trace data.

In embodiments, the data processing apparatus further comprises trace analysing logic operable to receive said energy management information items, said trace analysing logic be further operable to display an indication of the energy consumption of said data processing elements when processing said data for use when optimising the processing of said data by said data processing elements.

Accordingly, the trace analysing logic analyses the information items and provides in a convenient format an indication of the energy consumption of one or more of the processing elements when processing the data.

In embodiments, said energy management unit is operable to determine an amount of additional energy available for use by said at least one of said data processing elements when processing said sequence of instructions and said energy state comprises said amount of additional energy available, and said data processing apparatus further comprises trace analysing logic operable to receive said energy management information items, said trace analysing logic be further operable to display an indication of the amount additional energy available for use by said at least one of said data processing elements when processing said sequence of instructions for use when optimising said sequence of instructions or said energy management unit.

In embodiments, said at least one of said data processing elements is operable to process an algorithm which determines for said sequence of instructions an estimated energy consumption of said data processing elements when executing said sequence of instructions, energy management unit is operable to generate an energy consumption of said at least one of said data processing elements when processing said sequence of instructions and said energy state comprises said estimated energy consumption and said energy consumption, and said data processing apparatus further comprises trace analysing logic operable to receive said energy management information items, said trace analysing logic be further operable to display an indication of the difference between said estimated energy consumption and said energy consumption for use when optimising said algorithm or said sequence of instructions.

In embodiments, the at least one data processing element comprises a processor core operable to execute the sequence of instructions and the energy management unit is operable to generate energy management information indicative of an energy state of the processor core when executing the sequence of instructions.

According to a second aspect there is provided a method, comprising the steps of: generating energy management information indicative of an energy state of a data processing element when processing data; and receiving the energy management information and using trace logic to generate energy management information items as trace data associating said energy state with the processing of the data.

In embodiments, the data processing element may comprise any unit of a data processing apparatus such as, for example, a processor core, a bus, memory device, or other processing component or unit.

In embodiments, the method of the second aspect includes method steps corresponding to the functions performed by features of the first aspect.

According to a third aspect there is provided an analysing method, comprising the steps of: receiving energy management information items associating data being processed by a data processing element with an energy state of the data processing element when processing the data; and determining, from the energy management information items, an amount of energy being consumed by the data processing element when processing the data.

Hence, the amount of energy consumed can readily be determined from the information items. It will be appreciated that providing this information can assist when seeking to optimise the energy usage of a data processing element. The data processing element may comprise any unit of a data processing apparatus such as, for example, a processor core, a bus, memory device, or other processing component or unit.

In embodiments, the method comprises the step of: optimising the operation of said data processing element to decrease said amount of energy consumed by said data processing element when processing said data.

Hence, the operation of the data processing element can be altered or modified in order to reduce the energy consumed by that data processing element when processing the data.

In embodiments, said data comprises a sequence of instructions, and the method comprises the step of optimising the sequence of instructions to decrease the amount of energy consumed by the data processing element.

Hence, the sequence of instructions can be altered or modified in order to reduce the energy consumed by the data processing element when executing the sequence of instructions.

In embodiments, the step of optimising comprises altering instructions in the sequence of instructions to decrease the amount of energy consumed by the processor core.

Altering the instructions by, for example, removing, changing or reorganising instructions can decrease the amount of energy consumed and it may be possible to operate the data processing element at a lower predetermined energy setting, thereby optimising energy usage.

In embodiments, said data comprises a sequence of instructions and the energy management information items provide an indication of a selected one a number of predetermined energy settings that the data processing element is being operated and the energy consumption of the data processing element when executing the sequence of instructions, and the method comprises the steps of: determining, from the energy management information items, an amount of additional energy available for use by the data processing element when executing the sequence of instructions; and optimising the sequence of instructions to decrease the amount of additional energy available for use by the data processing element.

Accordingly, for any particular energy setting, the sequence of instructions may be adjusted to increase performance or functionality whilst still remaining within the energy consumption limit of that energy setting.

In embodiments, the step of optimising comprises adding additional instructions to the sequence of instructions to increase the amount of energy consumed by the data processing element.

In embodiments, the energy management information items provide an indication of an estimated energy consumption of the data processing element when processing the data and the energy consumption of the data processing element when processing the data, and the method comprises the steps of: determining, from the energy management information items, an amount of difference between the estimated energy consumption and the energy consumption when processing the data- and optimising an algorithm used to generate the estimated energy consumption to reduce the amount of difference.

Hence, the information items can be used to optimise the performance or increase the accuracy of the algorithm used to generate the estimated energy consumption.

In embodiments, the data processing element comprises a processor core.

According to a fourth aspect there is provided a computer program product operable when executed on a computer to perform the method steps of the second or third aspect.

DESCRIPTION OF NON-LIMITING EXAMPLE EMBODIMENTS

Figure 1:
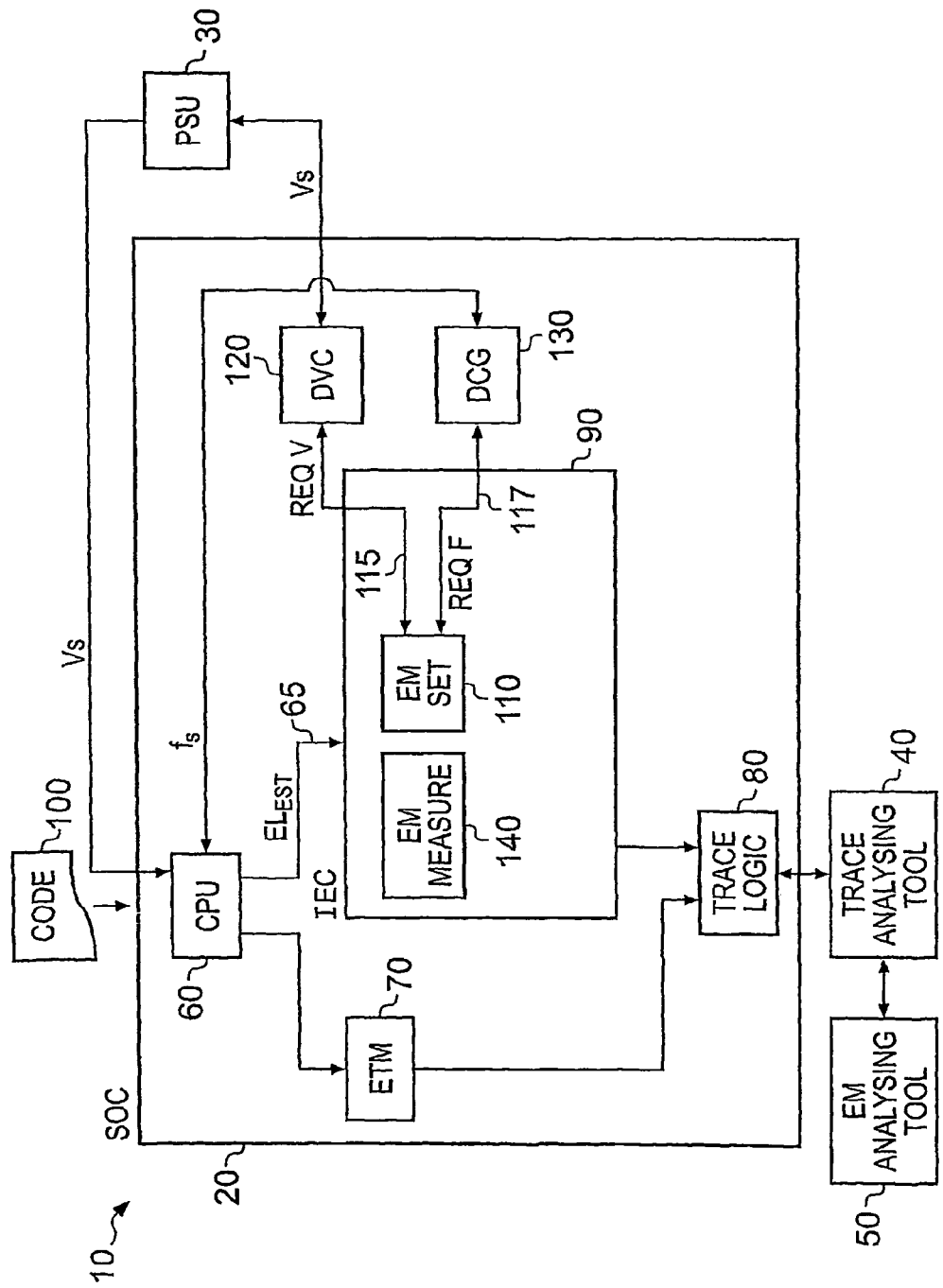
FIG. 1 is a block diagram of a data processing apparatus according to an example embodiment.

FIG. 1 illustrates a data processing apparatus, generally 10, according to one example embodiment. The data processing apparatus 10 comprises a system-on-a-chip (SOC) 20 coupled with a power supply unit 30 and a trace analysing tool 40. The power supply unit 30 is arranged to vary the power supplied to a processor core 60 within the SOC 20 in accordance with energy management requirements as will be described in more detail below. The trace analysing tool 40 receives trace data from the processor core 60 for subsequent analysis. Trace data relating to the energy state of the processor core 60 is forwarded by the trace analysing tool 40 for analysis by an energy management analysing tool 50 coupled with the trace analysing tool 40. The trace data relating to the energy state of the processor core 60 is used by energy management analysing tool 50 to provide an indication of the energy state of the processor core 60 when processing data. This indication can then be utilised to improve the energy management of the processor core 60 by providing a one-to-one correlation between time, particular events or the processing of instructions or groups of instructions and the energy state of the processor core 60. In particular, the indication can be used to optimise the energy consumption of the data processing apparatus 10. Furthermore, where the indication provides a correlation between instructions or groups of instructions, the indication can be used to optimise the energy consumption of the sequence of instructions and even to optimise the estimated energy consumption algorithms executed by the processor core 60, as will also be explained in more detail below. Whilst to aid understanding, the present embodiment describes energy management with respect to the processor core 60 when executing instructions, it will be appreciated that these principles may equally be applied to energy management of any element of the data processing apparatus 10 such as, for example, buses, controllers, memories, other processing components or units, or even a state machine (not shown) when processing data.

The SOC 20 comprises a processor core 60 which is coupled with an embedded trace macrocell 70 which provides instruction trace and data trace to trace logic 80, as is well known in the art.

The processor core 60 is also coupled with an intelligent energy controller (IEC) 90 which is operable to control the energy provided to the processor core 60 in order to maximise energy usage. For example, the IEC 90 will seek to optimise the energy consumed by the processor core 60 in dependence on the type of tasks or activities being performed by the processor core 60. For example, when the processor core 60 is performing a particularly intensive task the IEC 90 will seek to cause the processor core 60 to operate at a high energy setting in order to maximise the performance of the processor core 60. However, should it be determined that the processor core 60 is performing a less intensive or less critical task then the IEC 90 will seek to cause the processor core 60 to operate at a lower energy setting since it has been determined that the tasks can still be performed adequately despite the processor core 60 be operated at a lower performance level. As mentioned above, the IEC 90 may also be used to control the energy provided to other elements of the data processing apparatus 10. Techniques for performing intelligent energy management are well known see, for example, U.S. patent application Ser. No. 10/687,924 filed on 20 Oct. 2003, now U.S. Pat. No. 7,321,942, and U.S. patent application Ser. No. 10/715,594 filed on 19 Nov. 2003, now U.S. Pat. No. 7,194,647, both assigned to ARM Limited. In particular, intelligent energy management (IEM) software within the operating system will typically review a particular task, thread, process, routine or other sequence of the code 100 when that section of code is initiated and will determine an estimated energy level $EL_{EST}$ at which the processor core 60 should be operated in order to satisfactorily execute the code whilst still satisfying any associated performance criteria.

The estimated energy level signal $EL_{EST}$ is provided by the IEM software of the operating system over the path 65 to the IEC 90. The IEC 90 reviews the estimated energy level signal $EL_{EST}$ and selects one of a predetermined energy level settings at which to operate the processor core 60. For example, the energy levels settings may be to operate the processor core at a 25% energy setting, a 50% setting, and a 75% setting in addition to a maximum (100%) setting and a minimum (0%) setting. The processor core 60 will be operated at any one of those settings at any particular time. In order to determine which setting to operate the processor core 60, the energy management setting unit 110 will review the value $EL_{EST}$ received from the IEM software and select the next highest energy setting which enables that estimated energy level to be achieved. For example, in the event that the signal $EL_{EST}$ indicates a energy level of 18% is required, then the energy management setting unit 110 will output values to the dynamic voltage controller 120 and the dynamic clock generator 130 to drive the processor core at a 25% setting. Similarly, in the event that the signal $EL_{EST}$ indicates a requirement of 74%, then the energy management setting unit 110 will output signals which enable the processor core 60 to be driven at the 75% setting. In this way, it will be appreciated that it is possible to optimise the energy setting of the processor core 60 to match the particular task to be performed.

In order to drive the processor core 60 at the selected energy level setting, the energy management setting unit 110 receives the $EL_{EST}$ signal from the processor core 60 and translates this requested amount of energy into a voltage and frequency requirement at which to drive the processor core 60. The voltage requirement REQV is provided over the path 115 to a dynamic voltage controller 120. The dynamic voltage controller 120 translates the voltage requirement into an actual voltage level Vs which the power supply unit 30 should supply to the processor core 60. Also, the frequency requirement REQF is provided over the path 117 to a dynamic clock generator 130. The dynamic clock generator 130 translates the signal REQF to an actual clock frequency fs which should be supplied to the processor core 60. For example, should the IEM software issue an $EL_{EST}$ signal indicating that a maximum energy setting should be used then the energy management setting unit 110 will provide a REQV signal to the dynamic voltage controller 120 indicating that the dynamic voltage controller 120 should control the power supply unit 30 in order to supply the maximum operating voltage to the processor core 60. Similarly, the energy management setting unit 110 will provide a signal REQF to the dynamic clock generator 130 and the dynamic clock generator 130 will drive the processor core 60 at the maximum operating frequency. Conversely, should the signal $EL_{EST}$ indicate that the processor core should be driven at a minimum energy setting then signals will be provided which cause the power supply unit 30 to operate the processor core 60 at a zero or the minimum operating voltage, whilst the dynamic clock generator 130 will be caused to operate the processor core 60 at a zero or a minimum clock frequency. It will be appreciated that reducing the performance level of the processor core 60 is achieved by reducing its operating voltage and operating frequency. As the operating voltage is reduced, the power consumption drops more because there is a square law relationship between power and voltage. Although the processor core 60 must run for a longer period of time at a reduced frequency, running at this lower power level means that less total energy is used over time.

Also provided within the IEC 90 is an energy management measuring unit 140. The energy management measuring unit 140 performs an analysis of the actual consumption of energy by the processor core 60. For example, the energy management measuring unit 140 may collect information regarding the actual operating voltage of the processor core 60, the current consumed by the processor core 60, together with details of the actual operating frequency of the processor core 60. Also, the energy management measuring unit 140 may collect information detailing how many of the available cycles were spent executing a particular sequence of instructions. From this information it will be appreciated that it is possible to derive an actual energy consumption level of the processor core 60 when executing an individual or a particular sequence of instructions. This information may be generated on a cycle-by-cycle basis thereby providing an indication of the energy consumption in each cycle or some other time basis. Equally, the energy consumption information may be collated in order to provide an indication of the energy consumed by a particular application, process, task or other sequence of code. Furthermore, the energy consumption information may be collated in order to provide an indication of the energy consumed in response to a particular event such as, for example, the occurrence of a bulk transfer to a particular device, the occurrence of accesses to a bus or memory, the occurrence of an interrupt or change of mode.

The embedded trace macrocell 70 is operable, as is well known in the art, to provide instruction and data trace information to the trace logic 80. In addition to the instruction and data trace provided by the embedded trace macrocell 70, the IEC 90 provides trace information relating to energy management to the trace logic 80. In is particular, the IEC 90 is arranged to provide trace items which indicate the value of the estimated power consumption $EL_{EST}$ which was generated by the IEM software residing in the operating system. Similarly, the IEC 90 will generate trace data indicating the particular energy level setting selected by the energy management setting unit 110 in response to the $EM_{EST}$ signal. Furthermore, the EEC 90 will provide trace data indicating the actual energy consumption derived by the energy management measuring unit 140. These items of trace information are provided to the trace analysing tool 40 for use by the energy management analysing tool 50 coupled with the trace analysing tool 40.

Generating these items of trace information provides significant benefits when attempting to optimise the energy management of the processor core 60. For example, as mentioned previously, it is possible to compare the estimated energy requirement generated by the IEM software in the operating system with the actual energy consumption in order to help validate and further optimise this algorithm. Also, it is possible to ensure that the energy management setting unit 110 is operating correctly in response to the estimated energy requirement. Additionally, it is possible to optimise the energy setting levels supported by the energy management setting unit 110 in order to more closely align with the most commonly occurring energy requirements. Equally, it is possible to use the actual energy consumption information in order to optimise the software code to operate in a more energy efficient manner. Furthermore, it is possible to obtain an indication of the amount of unused energy available to the processor core 60 and use that information to determine whether another task may be initiated without causing the processor core 60 to operate at a higher energy setting. Also, it is possible to modify the operation of the processor core 60 to reduce the amount of energy consumed. Accordingly, it can be seen that providing such energy management trace information in a way which correlates with specific instructions or groups of instructions provides the opportunity to perform very useful energy analysis techniques. More details on the use of the management trace information will be discussed in more detail below with reference to FIGS. 3 to 5.

Figure 2:
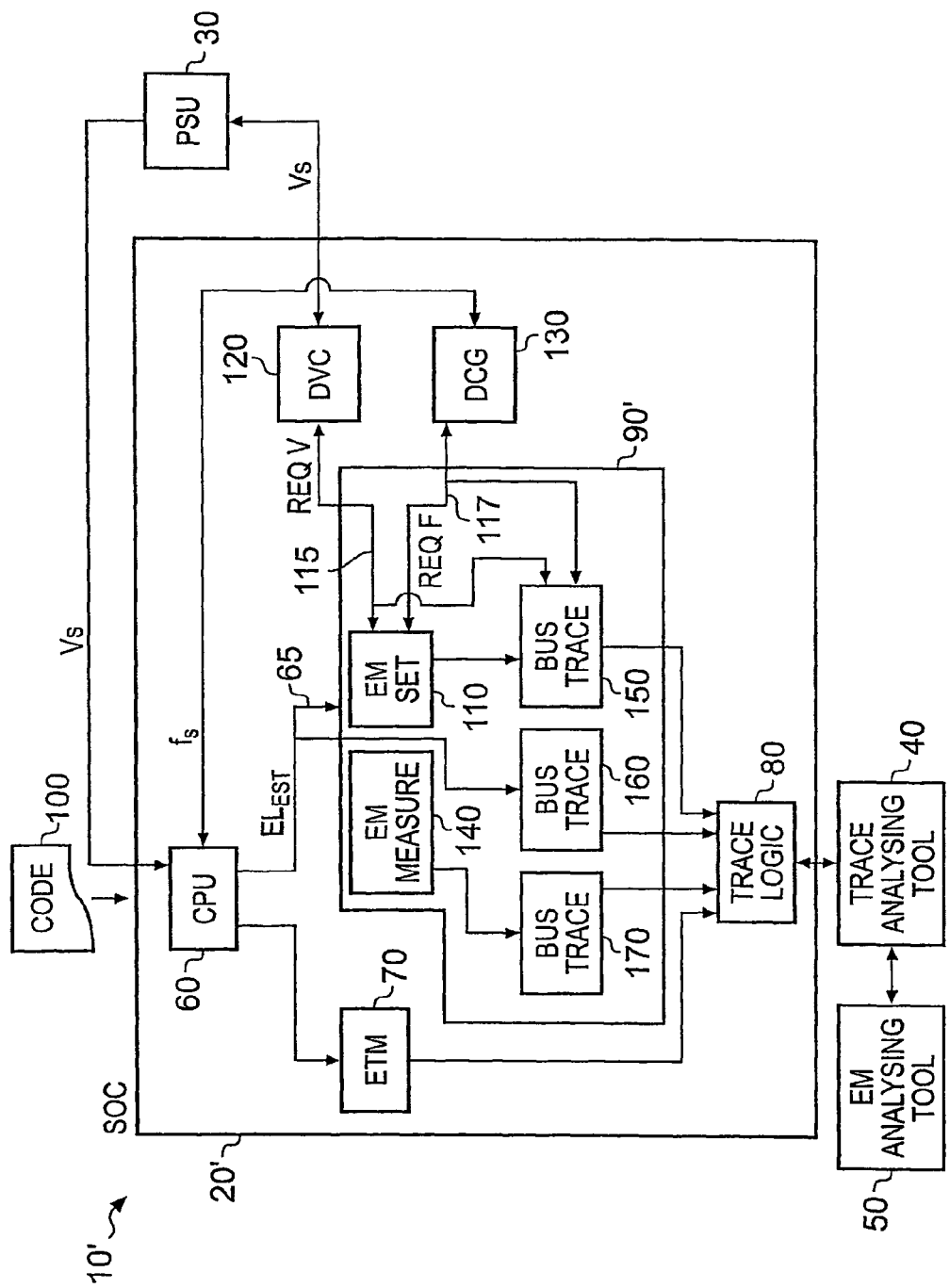
FIG. 2 is a block diagram of a data processing apparatus according to another example embodiment.

FIG. 2 illustrates a data processing apparatus 10' according to a second example embodiment. The second embodiment differs from that of FIG. 1 in that separate bus trace units 150, 160, 170 are provided for the different types of energy management trace information to be provided to the trace logic 80.

In particular, a bus trace unit 150 is provided which provides trace information relating to the energy level settings made by the IEM setting unit 110. Also, a bus trace unit 160 is provided which provides trace information relating to the energy level estimated by the IEM software of the operating system. Also, a bus trace unit 170 is provided which provides trace information relating to the actual measured energy consumption of the processor core 60.

Figure 3:
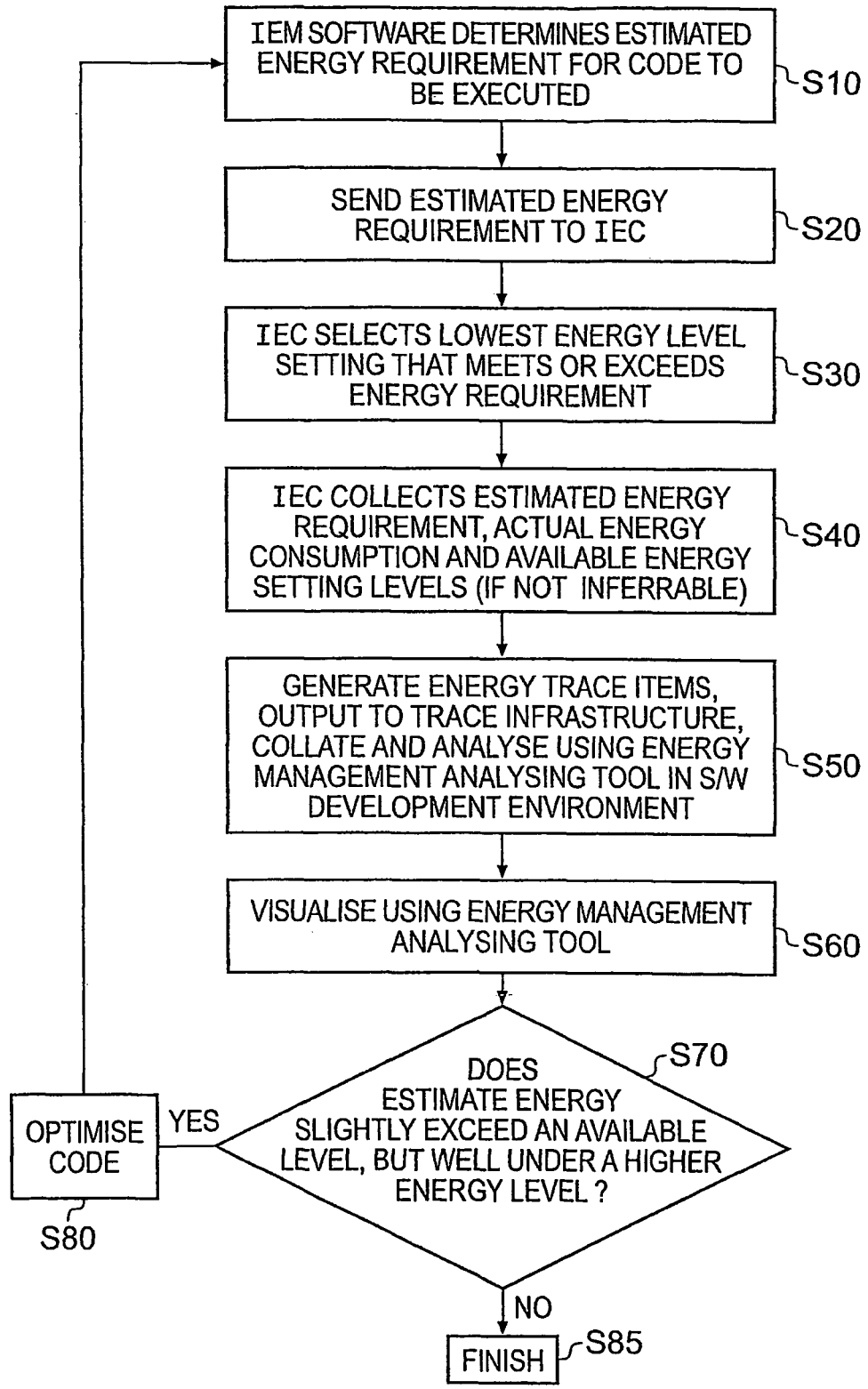
FIG. 3 is a flow chart illustrating one sequence of operations of the data processing apparatus of FIG. 1 or 2.

FIG. 3 is a flow chart illustrating in more detail the operation of the data processing apparatus 10, 10' shown in FIGS. 1 and 2.

At step S10, the code 100 is executed on the processor core 60. The IEM software of the operating system reviews the code 100 and generates an estimated energy level requirement $EL_{EST}$.

At step S20, the estimated energy level requirement $EL_{EST}$ is sent by the IEM software to the IEC 90, 90'.

At step S30, the energy management setting unit 110 reviews the estimated energy level against the predetermined energy settings available. The energy management setting unit 110 will then select an energy setting which meets or exceeds the estimated energy level (i.e. selects a setting which is at least as high as the estimated energy level).

At step S40, the IEC 90, 90' will generate trace items indicating the estimated energy level requirement provided by the IEM software, the actual energy consumed by the processor core 60 and, if the energy setting levels available to the energy management setting unit 120 are not inferable, trace data regarding the available levels may be generated.

At step S50, the trace items are collated by the trace logic 80 and are either provided to a trace port for capture by the trace analysing tool 40 or they are stored in a trace buffer for subsequent analysis by the trace analysing tool 40 and energy management analysing tool 50.

At step S60, the energy management analysing tool 50 provides a visual representation of the energy state of the processor core 60 represented by the energy management trace information in a manner convenient to the user.

At step S70, a determination is made of the relationship between the actual energy consumption and the available predetermined energy levels. In the event that the actual energy matches or is slightly below the selected energy level then it is unlikely that any optimisations are necessary and processing finishes at step S85. However, in the event that there is a large discrepancy between the energy consumption and the selected energy level (for example, the energy consumption is well below the selected energy level and slightly above the next lowest energy level setting) then optimisations may be made to the code 100 in order to reduce energy consumption such that the energy consumption may be reduced to a level which is below the next lowest energy level setting. This will in turn enable the energy level setting to be reduced.

Accordingly, at step S80, the code 100 is modified and processing returns to step S20 where the modify code is executed on the processor core 60. In this way, it will be appreciated that a software developer is provided with visibility of how the code under development causes energy consumption to change and is able to optimise the code in order to optimise energy consumption.

Figure 4:
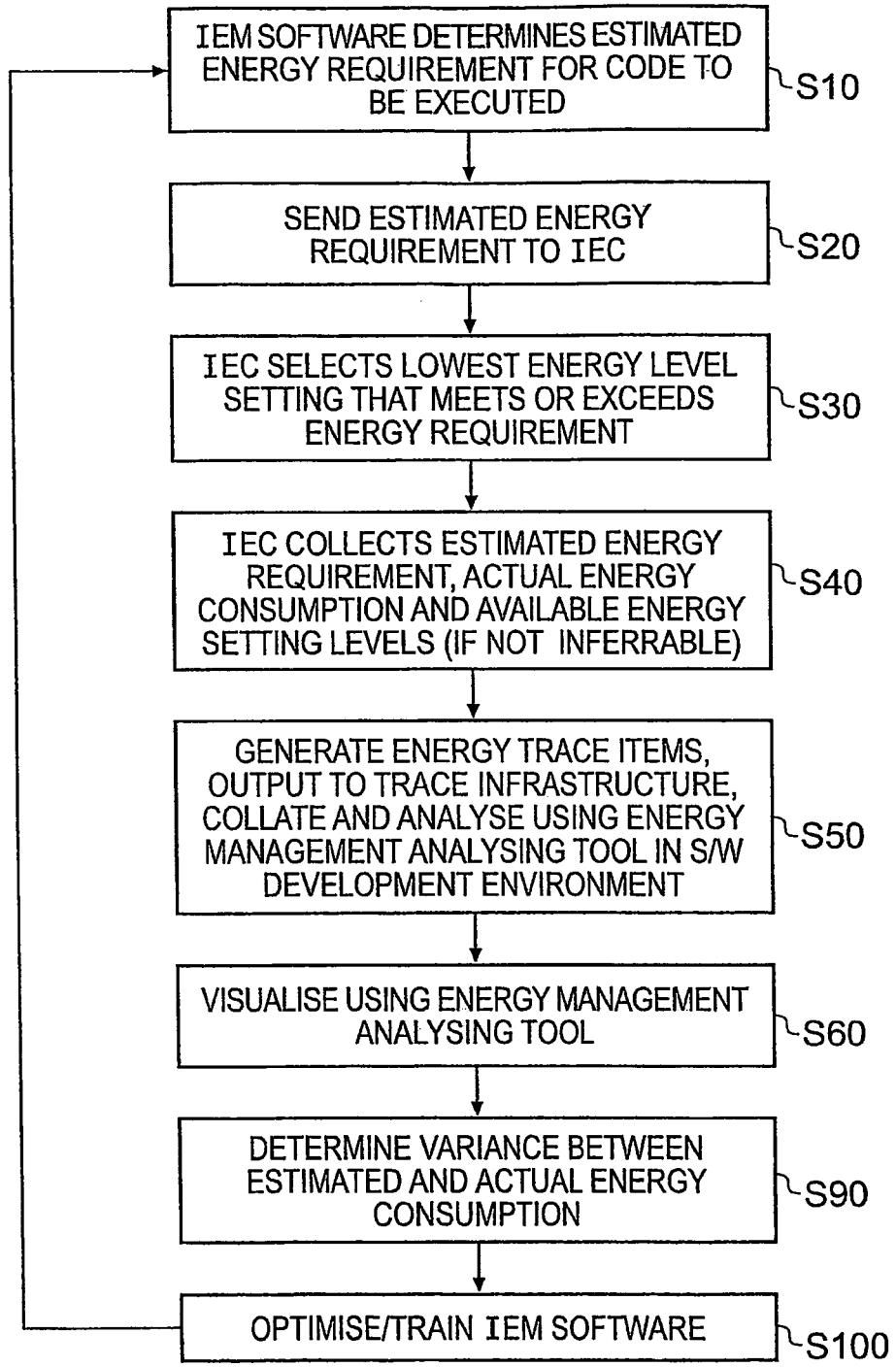
FIG. 4 is a flow chart illustrating another sequence of operations of the data processing apparatus of FIG. 1 or 2.

FIG. 4 illustrates a further operation of the data processing apparatus 10, 10' shown in FIGS. 1 and 2.

Firstly, the processing steps of S10 to S60 are performed in the same manner as described in FIG. 3.

Thereafter, at step S90, a determination is made of the variance between the estimated energy consumption derived by the IEM software in the operating system and the actual energy consumption measured by the energy management measuring unit 140.

At step S100, the difference between the estimated consumption and the actual consumption is utilised in order to optimise the performance of the IEM software. Once the IEM software has been modified, this modified IEM software is integrated into the operating system and processing returns to step S20 whereby the software code 100 is rerun on the processor core 60 and the modified IEM software will generate a new estimated energy consumption value.

In this way, it will be appreciated that information on the performance of the IEM software becomes visible to the software developer which enables the developer to optimise or train that software in order to improve its performance.

Figure 5:
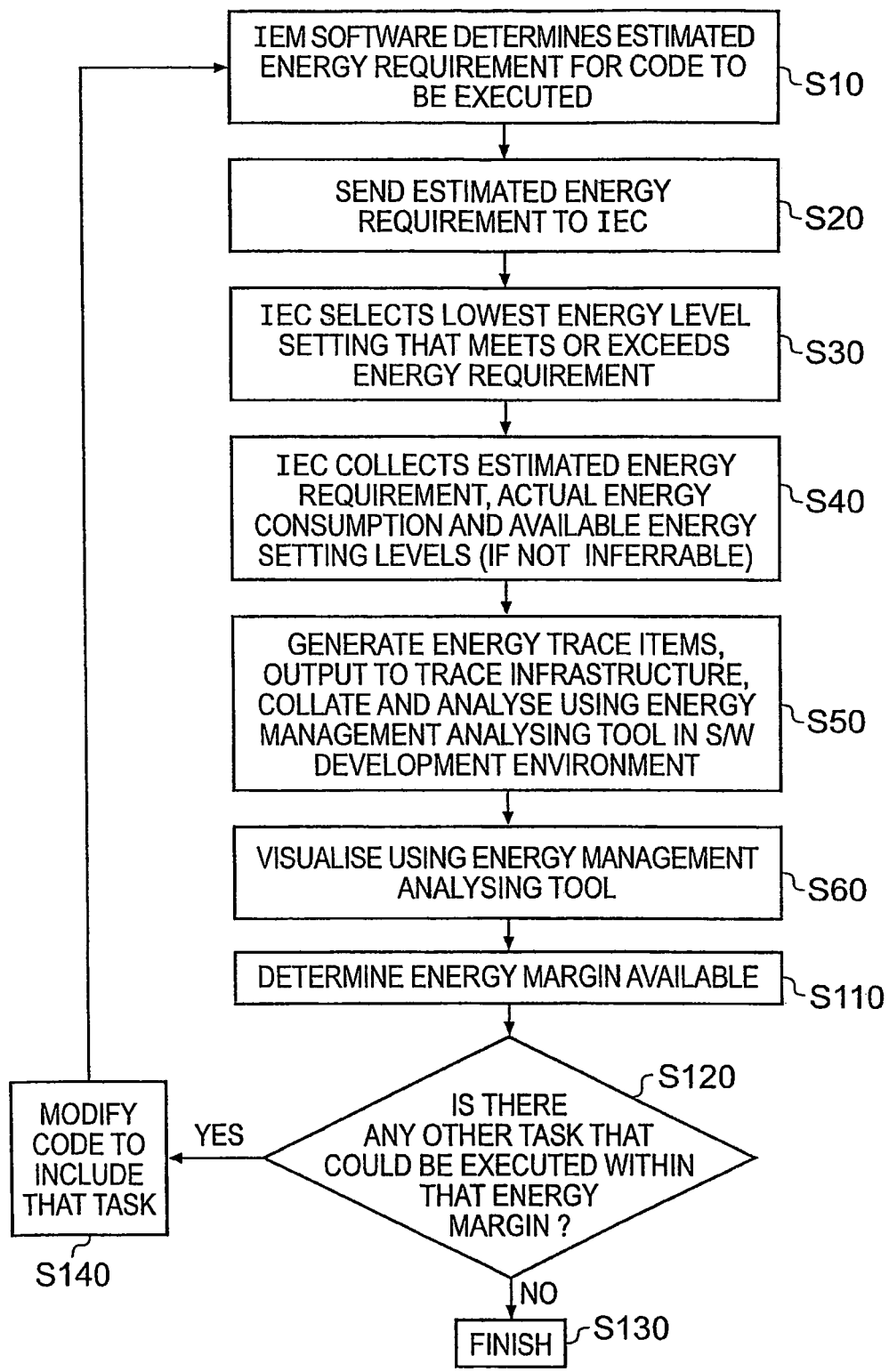
FIG. 5 is a flow chart illustrating a further sequence of operations of the data processing apparatus of FIG. 1 or 2.

FIG. 5 illustrates a further operation of the data processing apparatus 10, 10' shown in FIGS. 1 and 2.

Firstly, the processing steps of S10 to S60 are performed in the same manner as described in FIG. 3.

Thereafter, at step S110, a determination is made of amount of energy margin available. This is calculated by determining the difference between the actual energy consumed, which is measured by the energy management measuring unit 140, and the energy level setting made by the IEC 90.

At step S120, a determination is made whether there is any other software code which could be executed to use up that energy margin and still remain level setting. In the event that no other software code is identified which could be included then processing finishes at step S130.

In the event that further code is identified for inclusion then, at step S140, the software code 100 is modified to include the additional code and processing returns to step S10 whereby the modified software code is rerun on the processor core 60.

In this way, it will be appreciated that information on the performance of the software becomes visible to the software developer which enables the developer to optimise that software in order to maximise energy usage.

It will be appreciated that by providing energy management trace information significantly enhances the understanding of energy usage by supporting direct correlation between the processing of data and voltage and frequency data. A user is provided with visibility of energy management parameters and status information which can then be used to optimise the performance and energy requirements of a user application, the IEC 90, 90', the IEM software or the operation of the data processing apparatus itself. This is possible because energy management information is received which is not normally inferable at the application level. In particular, it is possible to view the relationship between the delivered and required performance in an embedded intelligent energy management system even though this information is not normally visible and is generally only controllable by the operating system. By having knowledge of the dynamic voltage and frequency settings, it is possible to more accurately understand energy usage and also enables correlation between available energy or power and individual task energy usage. This information can be provided directly to the user when developing an application or optimising hardware performance. By using trace techniques to provide this information it is possible to ensure that the energy management information is provided non-invasively. It will be appreciated that the trace information may be provided with varying levels of resolution (e.g. task level, process level, application level, instruction level and/or time stamp level). Furthermore, profile extensions may be provided to help with the visualisation of energy management information in order to provide an indication of the proportion of time in particular states and identified with the software applications, together with viewing the energy management software operation in relation to the clock and power control hardware.

Although a particular example embodiments have been described herein, it can be apparent that the claims are not limited thereto, and that many modifications and additions may be made within the scope of the claims.

The invention claimed is:

1. A data processing apparatus comprising system on chip including:
   data processing elements configured to process data;
   an energy management unit hardware configured to generate energy management information indicative of an energy state of at least one of said data processing elements when processing said data; and
   trace logic hardware configured to generate instruction trace information and data trace information, to receive said energy management information to generate, while said processing of said data continues, energy management information items associating said energy state with the processing of said data as trace data, and to transmit said trace data from said system on chip to trace analysing logic.

2. The data processing apparatus as claimed in claim 1, wherein said logic is configured to generate said energy management information items associating said energy state when processing said data with time.

3. The data processing apparatus as claimed in claim 1, wherein said logic is configured to generate said energy management information items associating said energy state when processing said data with events.

4. The data processing apparatus as claimed in claim 1, wherein said data comprises a sequence of instructions and said logic is configured to generate said energy management information items associating said sequence of instructions with said energy state.

5. The data processing apparatus as claimed in claim 4, wherein said logic is configured to generate an energy management information item associating an instruction with said energy state of said at least one of said data processing elements when processing that instruction.

6. The data processing apparatus as claimed in claim 4, wherein said logic is configured to generate an energy management information item associating a group of instructions with said energy state of said at least one of said data processing elements when processing that group of instructions.

7. The data processing apparatus as claimed in claim 1, wherein said energy state of said at least one of said data processing elements comprises an energy consumption of said at least one of said data processing elements when processing said data.

8. The data processing apparatus as claimed in claim 7, wherein said energy consumption is a function of an operating voltage of said at least one of said data processing elements and an amount of time taken by said at least one of said data processing elements when processing said data.

9. The data processing apparatus as claimed in claim 1, wherein said at least one of said data processing elements is configured to process an algorithm which determines for said data an estimated energy consumption of said at least one of said data processing elements when processing said data and said energy state of said at least one of said data processing elements comprises said estimated energy consumption.

10. The data processing apparatus as claimed in claim 9, wherein said algorithm receives an indication of performance criteria associated with said data and is configured to determine a minimum estimated energy consumption of said at least one of said data processing elements which is estimated to enable said performance criteria to be achieved.

11. The data processing apparatus as claimed in claim 10, wherein said minimum estimated energy consumption is function of a minimum operating voltage and operating frequency of said at least one of said data processing elements which is estimated to enable said performance criteria to be achieved.

12. The data processing apparatus as claimed in claim 10, wherein said energy management unit hardware is responsive to said minimum estimated energy consumption to select one of a number of predetermined energy settings that said at least one of said data processing elements should be operated at and said energy state of said at least one of said data processing elements comprises an indication of the selected one of said number of predetermined energy settings.

13. The data processing apparatus as claimed in claim 12, wherein each of said predetermined energy settings has a predetermined voltage and predetermined frequency at which said at least one of said data processing elements should be operated.

14. The data processing apparatus as claimed in claim 1, wherein said energy management unit hardware is configured to determine an amount of additional energy available for use by said at least one of said data processing elements when processing said data and said energy state comprises said amount of additional energy available.

15. The data processing apparatus as claimed in claim 13, wherein said energy management unit hardware is configured to determine said amount of additional energy available using an energy consumption of said at least one of said data processing elements when processing said data and a selected one of a number of predetermined energy settings that said at least one of said data processing elements should be operated.

16. The data processing apparatus as claimed in claim 13, wherein said energy management unit hardware is configured to determine said amount of additional energy available using an estimated energy consumption of said at least one of said data processing elements when processing said data and a selected one of a number of predetermined energy settings that said at least one of said data processing elements should be operated.

17. The data processing apparatus as claimed in claim 1, further comprising:
   trace analysing logic configured to receive said energy management information items, said trace analysing logic be further configured to display an indication of the energy consumption of said data processing elements when processing said data for use when optimising the processing of said data by said data processing elements.

18. The data processing apparatus as claimed in claim 4, wherein said energy management unit hardware is configured to determine an amount of additional energy available for use by said at least one of said data processing elements when processing said sequence of instructions and said energy state comprises said amount of additional energy available, said data processing apparatus further comprising:
   trace analysing logic configured to receive said energy management information items, said trace analysing logic be further operable to display an indication of the amount additional energy available for use by said at least one of said data processing elements when processing said sequence of instructions for use when optimising said sequence of instructions or said energy management unit.

19. The data processing apparatus as claimed in claim 4, wherein said at least one of said data processing elements is configured to process an algorithm which determines for said sequence of instructions an estimated energy consumption of said data processing elements when executing said sequence of instructions, energy management unit hardware is configured to generate an energy consumption of said at least one of said data processing elements when processing said sequence of instructions and said energy state comprises said estimated energy consumption and said energy consumption, said data processing apparatus further comprising:

trace analysing logic configured to receive said energy management information items, said trace analysing logic be further configured to display an indication of the difference between said estimated energy consumption and said energy consumption for use when optimising said algorithm or said sequence of instructions.

20. The data processing apparatus as claimed in claim 4, wherein said at least one data processing element comprises a processor core configured to execute said sequence of instructions and said energy management unit hardware is operable to generate energy management information indicative of an energy state of said processor core when executing said sequence of instructions.

21. A method, comprising the steps of:
generating with energy management unit hardware energy management information indicative of an energy state of a data processing element of a system on chip when processing data;
receiving said energy management information and using trace hardware of said system on chip to generate, while the processing of said data continues, trace data including instruction trace information, data trace information, and energy management information items, said trace data associating said energy state with said processing of said data, and
transmitting said trace data from said system on chip to trace analysing logic.

22. An analysing method, comprising the steps of:
receiving from trace hardware of a system on chip, trace data comprising instruction trace, data trace, and energy management information items, said trace data associating data being processed by a data processing element of said system on chip with an energy state of said data processing element when processing said data; and
determining, from said energy management information items, an amount of energy being consumed by said data processing element when processing said data.

23. The method of claim 22, comprising the step of:
optimising the operation of said data processing element to decrease said amount of energy consumed by said data processing element when processing said data.

24. The method of claim 22, wherein said data comprises a sequence of instructions, said method comprising the step of:
optimising said sequence of instructions to decrease said amount of energy consumed by said data processing element.

25. The method of claim 24, wherein said step of optimising comprises altering instructions in said sequence of instructions to decrease said amount of energy consumed by said data processing element.

26. The method of claim 22, wherein said data comprises a sequence of instructions and said energy management information items provide an indication of a selected one a number of predetermined energy settings that said data processing element is being operated and said energy consumption of said data processing element when processing said sequence of instructions, the method comprising the step of:
determining, from said energy management information items, an amount of additional energy available for use by said data processing element when processing said sequence of instructions; and
optimising said sequence of instructions to decrease said amount of additional energy available for use by said data processing element.

27. The method of claim 26, wherein said step of optimising comprises adding additional instructions to said sequence of instructions to increase said amount of energy consumed by said data processing element.

28. The method of claim 22, wherein said energy management information items provide an indication of an estimated energy consumption of said data processing element when processing said data and said energy consumption of said data processing element when processing said data, the method comprising the step of:
determining, from said energy management information items, an amount of difference between said estimated energy consumption and said energy consumption when processing said data; and
optimising an algorithm used to generate said estimated energy consumption to reduce said amount of difference.

29. The method of claim 21, wherein said data processing element comprises a processor core.

30. A computer program product operable when executed on a computer to perform the method steps of claim 21.

* * * * *

UNITED STATES PATENT AND TRADEMARK OFFICE
CERTIFICATE OF CORRECTION

PATENT NO. : 8,762,744 B2  
APPLICATION NO. : 12/085962  
DATED : June 24, 2014  
INVENTOR(S) : Ford et al.

It is certified that error appears in the above-identified patent and that said Letters Patent is hereby corrected as shown below:

On the Title page of the patent, Item No. (75) after Daryl Wayne Bradley, Cambridgeshire, delete "MI (US)", and insert -- (GB) --, and On the Title page of the patent, Item No. (75) after John Michael Horley, Cambridgeshire, delete "MI (US)", and insert -- (GB) --.

Signed and Sealed this  
Second Day of September, 2014

Michelle K. Lee  
*Deputy Director of the United States Patent and Trademark Office*